(12) United States Patent
Furusawa

(10) Patent No.: US 9,382,967 B2
(45) Date of Patent: Jul. 5, 2016

(54) VIBRATION ISOLATION DEVICE

(71) Applicant: TOYO TIRE & RUBBER CO., LTD., Osaka-shi, Osaka (JP)

(72) Inventor: Norimitsu Furusawa, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 301 days.

(21) Appl. No.: 14/084,001

(22) Filed: Nov. 19, 2013

(65) Prior Publication Data

US 2014/0175255 A1 Jun. 26, 2014

(30) Foreign Application Priority Data

Dec. 26, 2012 (JP) ................. 2012-282520

(51) Int. Cl.
*F16M 13/00* (2006.01)
*F16F 15/02* (2006.01)
*F16F 13/08* (2006.01)
*F16F 13/10* (2006.01)

(52) U.S. Cl.
CPC .............. *F16F 15/022* (2013.01); *F16F 13/08* (2013.01); *F16F 13/102* (2013.01); *F16F 13/103* (2013.01)

(58) Field of Classification Search
CPC ....... F16F 15/022; F16F 13/08; F16F 13/102; F16F 13/103
USPC ........ 248/562, 638; 267/140.11, 140.13, 113, 267/219
See application file for complete search history.

(56) References Cited

U.S. PATENT DOCUMENTS

| 4,159,091 | A | * | 6/1979 | Le Salver | F16F 9/3415 248/634 |
|---|---|---|---|---|---|
| 4,721,292 | A | * | 1/1988 | Saito | F16F 13/105 180/312 |
| 4,991,826 | A | * | 2/1991 | Hoying | F16F 13/30 267/140.14 |
| 5,145,156 | A | * | 9/1992 | Muramatsu | F16F 13/26 180/300 |
| 5,167,403 | A | * | 12/1992 | Muramatsu | F16F 13/26 267/140.13 |
| 5,209,460 | A | * | 5/1993 | Bouhours | F16F 13/262 267/140.13 |
| 5,217,211 | A | * | 6/1993 | Ide | F16F 13/26 267/140.13 |
| 5,462,262 | A | * | 10/1995 | Gennesseaux | F16F 13/264 267/140.13 |
| 5,839,720 | A | * | 11/1998 | Kojima | F16F 13/26 267/140.14 |
| 6,176,477 | B1 | * | 1/2001 | Takeo | F16F 13/105 267/140.11 |
| 2002/0109066 | A1 | * | 8/2002 | Baudendistel | F16F 13/268 248/562 |

FOREIGN PATENT DOCUMENTS

JP 11-325162 A 11/1999

* cited by examiner

*Primary Examiner* — Gwendolyn Baxter
(74) *Attorney, Agent, or Firm* — Westerman, Hattori, Daniels & Adrian, LLP

(57) ABSTRACT

To provide a vibration isolation device capable of preventing the sealing performance in liquid filling work from deteriorating and capable of simplifying maintenance of apparatuses in relation with the liquid filling work. A liquid chamber is filled with liquid from a through hole through a nozzle. A seal section is vulcanizingly formed in the periphery on one end side of the through hole. Because the seal section interferes with a nozzle and is elastically deformed, the sealing performance in pouring in the liquid can be secured. Also, because the seal section is arranged for every vibration isolation device, maintenance of a liquid filling device can be simplified compared with a case the seal section is arranged in the liquid filling device.

10 Claims, 10 Drawing Sheets

VIBRATION ISOLATION DEVICE

TECHNICAL FIELD

The present invention relates to a vibration isolation device, and relates specifically to a vibration isolation device capable of preventing the sealing performance in liquid filling work from deteriorating and capable of simplifying maintenance of apparatuses in relation with the liquid filling work.

BACKGROUND ART

Between an engine that becomes a vibration generating source of a vehicle and a vehicle body that receives vibration, a vibration isolation device is arranged in order to suppress transmission of vibration to the vehicle body side. As the vibration isolation device, one incorporating plural liquid chambers is known for example. In this vibration isolation device, the plural liquid chambers are connected to each other through orifices, and vibration is absorbed by resistance generated when the liquid passes through the orifices in vibrating. A technology for manufacturing the vibration isolation device, particularly a technology for filling a liquid chamber with liquid, is disclosed in Patent Literature 1.

According to the technology disclosed in Patent Literature 1, first, in order to decompress the inside of a space that becomes a liquid chamber, the tip of a nozzle is inserted into a through hole that communicates with the space. In the nozzle, because an O-ring is disposed in a pedestal arranged in the vicinity of the tip of the nozzle, when the tip of the nozzle is inserted into the through hole, the O-ring is interposed and compressed between the periphery of the through hole and the pedestal. Airtight is maintained by elasticity of the O-ring, and the inside of the space is decompressed by sucking the air inside the space through the nozzle. When the inside of the space has been decompressed sufficiently, liquid is poured in to the inside of the space from the nozzle through the through hole while airtight is maintained by the O-ring, and the inside of the space is filled with the liquid. After the liquid of a required amount has been filled, the nozzle is drawn out from the through hole, the through hole is sealed by a rivet or a spherical member, and thereby the liquid chamber is to be of a sealed structure.

CITATION LIST

Patent Literature

[Patent Literature 1] Japanese Unexamined Patent Application Publication No. H11(1999)-325162 (refer to FIG. 2)

SUMMARY OF INVENTION

Technical Problem

However, according to the technology described above, there was a problem that the O-ring arranged in the vicinity of the tip of the nozzle was used repeatedly, therefore wear and crack occurred in the O-ring, the O-ring slipped off, and the sealing performance deteriorated. Also, there was a problem that maintenance of the O-ring that was used repeatedly was necessary in order to secure the sealing performance.

The present invention has been developed in order to address the problems described above, and its object is to provide a vibration isolation device capable of preventing the sealing performance in liquid filling work from deteriorating and capable of simplifying maintenance of apparatuses in relation with the liquid filling work.

Solution to Problem and Advantageous Effects of Invention

In order to achieve the object, according to the vibration isolation device described herein, a first attaching member is connected to one of the vibration generating side and the vibration receiving side, and a second attaching member is connected to the other of the vibration generating side and the vibration receiving side. The first attaching member and the second attaching member are connected to each other in an elastically deformable manner by a vibration isolation base formed of a rubber-like elastic material, and a liquid chamber with the vibration isolation base being a part of a separation wall is filled with liquid. A through hole communicates with the liquid chamber, and the through hole penetrates either the first attaching member or the second attaching member. The through hole is sealed by a seal member that is inserted from one end side of the through hole, and the liquid filled in the liquid chamber is prevented from leaking.

The liquid is poured in to the liquid chamber from one end side of the through hole through a nozzle. A seal section is disposed in the periphery on one end side of the through hole, the seal section interferes with an end surface or an outer peripheral surface of the nozzle and is elastically deformed, and therefore the sealing performance in pouring in the liquid to the liquid chamber can be secured. Also, because the seal section is formed integrally with a rubber-like elastic material that is vulcanizingly adhered to the periphery on one end side of the through hole, the seal section can be prevented from being used repeatedly which is different from a case in which an O-ring is disposed in the nozzle. Because slipping off and deterioration of the seal section due to the repeated use can be prevented, there are effects that the sealing performance in the filling work of liquid can be prevented from deteriorating, and that maintenance of the apparatuses in relation with the filling work of liquid can be simplified.

According to the vibration isolation device, because the seal section does not interfere with the seal member, there is an effect of stabilizing the sealing performance of the through hole by the seal member. That is, when the seal section interferes with the seal member, the interference of the seal section cannot be made constant due to the tolerance of each member and the like, and variation possibly occurs in compression of the seal section. As a result, one in which compression of the seal section is insufficient may possibly be produced. On the other hand, by making the seal section not interfere with the seal member, the seal section does not affect the sealing performance of the through hole by the seal member, and therefore the sealing performance of the through hole by the seal member can be stabilized.

According to the vibration isolation device, a liquid chamber is partitioned into the first liquid chamber and the second liquid chamber, and the first liquid chamber is formed, with the vibration isolation base being a part of a separation wall. The 15 second liquid chamber is partitioned against and is communicating with the first liquid chamber by a partition member provided with an orifice passage, and at least a part of the separation wall is formed of a diaphragm made of a rubber-like elastic membrane. The outer peripheral section of the diaphragm is vulcanizingly adhered to an annular attaching plate, and the through hole is formed so as to penetrate the attaching plate in the thickness direction thereof. A communication hole is formed so as to penetrate the outer peripheral section of the diaphragm in the thickness direction thereof, and the communication hole communicates with the through hole on one end side of the through hole. Because the seal section is formed integrally with the outer peripheral section of the diaphragm, the seal section can be formed while the outer peripheral section of the diaphragm is vulcanizingly adhered to the attaching plate. Thus, there is an effect of facilitating formation of the seal section.

According to the vibration isolation device, the seal member is a spherical member pressed in to the through hole, and a step section or a taper section is formed on the inner peripheral surface on one end side of the through hole. In the step section or the taper section, the diameter on one end side is made larger than that on the other end side, and the seal member before being pressed in is locked by the step section or the taper section. Also, a dam section is formed in the periphery on one end side of the through hole integrally with the seal section. Because the dam section is set higher than the upper end of the seal member that is locked by the step section or the taper section, when the liquid poured in through the nozzle is stored, the seal member locked to the step section or the taper section can be immersed in the liquid.

Here, when a part of the seal member locked by the step section or the taper section is exposed from the surface of the liquid and is in contact with the air, if the seal member is pressed in to the through hole, the air is mixed in to the through hole (the liquid chamber), and the vibration isolation performance may possibly deteriorate. On the other hand, by pressing in the seal member immersed in the liquid to the through hole, the air can be suppressed from being mixed in to the inside of the through hole, and therefore there is an effect of being capable of securing the vibration isolation performance stably.

According to the vibration isolation device, because the inside diameter on one end side of the step section or the taper section is set smaller than the outside diameter of the tip of the nozzle, the tip of the nozzle can be prevented from being inserted to the step section or the taper section. As a result, there is an effect that the amount of the liquid poured in to the liquid chamber can be prevented from being reduced by a portion of the volume of the nozzle inserted to the step section or the taper section.

According to the vibration isolation device, in the seal section, a rubber membrane-like extension section is extended from the inner surface of the communication hole toward the through hole, and a lip section of an annular shape is raised in the axial direction from the inside in the radial direction of the extension section. Because the inside diameter of the communication hole is set larger than the outside diameter of the nozzle, the end surface of the nozzle can be pressed to the extension section. Also, because the outside diameter of the lip section is set larger than the inside diameter of the nozzle, when the end surface of the nozzle is pressed to the extension section, the lip section can be compressively deformed in the radial direction. As a result, there is an effect that the sealing performance with respect to the nozzle can be secured by the lip section.

According to the vibration isolation device, the distal end on the inner side in the radial direction of the extension section is arranged apart at an interval with respect to the outer periphery of the step section or the taper section. Therefore, there is an effect that a burr can be prevented from entering into the through hole when bulging out (burr) of the rubber-like elastic material is generated in molding the extension section.

BRIEF DESCRIPTION OF DRAWINGS

FIG. 1b is a front view of the vibration isolation unit as viewed from the direction of the arrow Ib of FIG. 1a.

DESCRIPTION OF EMBODIMENTS

Figure 1B:
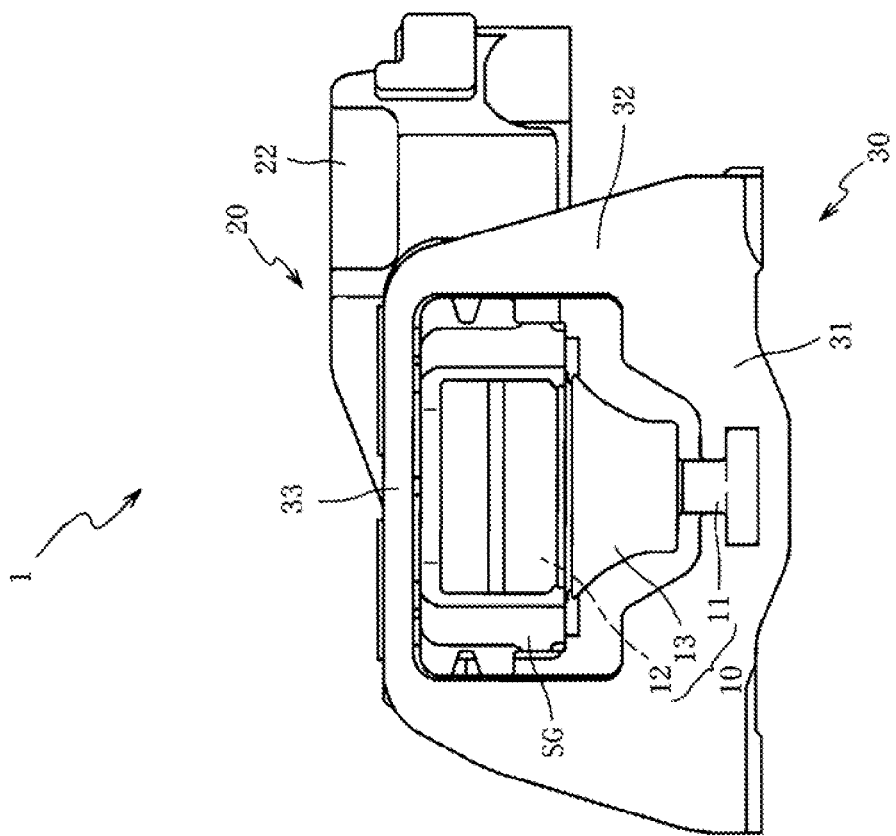
Figure 1A:
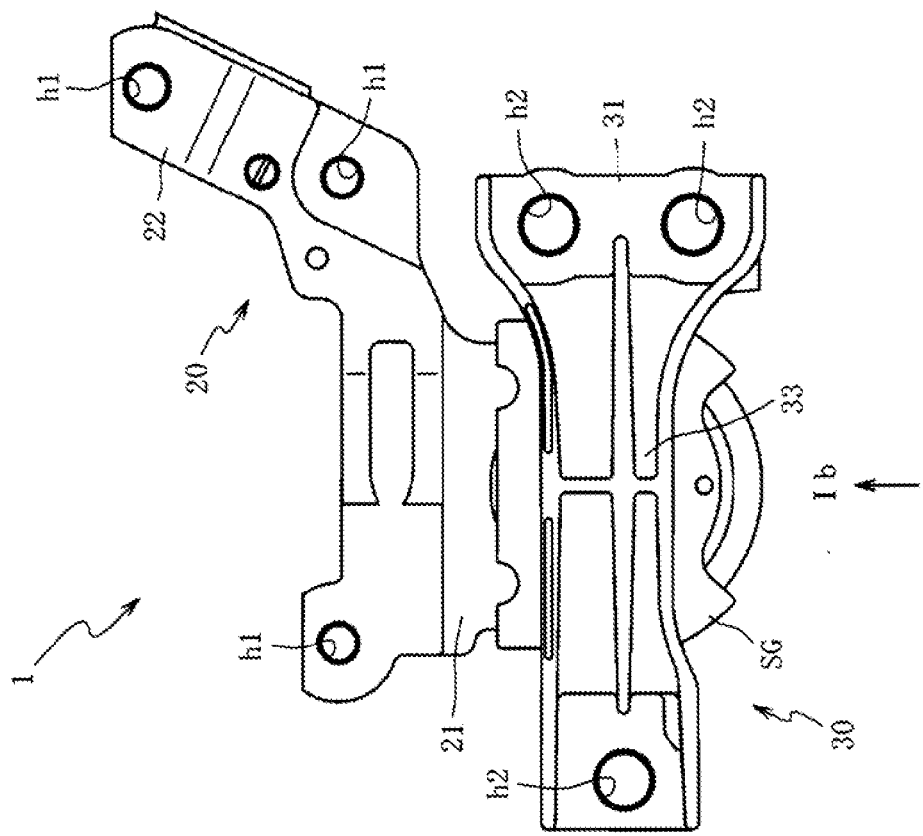
FIG. 1a is a plan view of the vibration isolation unit on which the vibration isolation device in a first embodiment of the present invention is mounted.

Hereinafter, preferred embodiments of the present invention will be described referring to the attached drawings. FIG. 1a is a plan view of a vibration isolation unit 1 on which a vibration isolation device 10 in a first embodiment of the present invention is mounted, and FIG. 1b is a front view of the vibration isolation unit 1 as viewed from the direction of the arrow Ib of FIG. 1a.

The vibration isolation unit 1 is a device for preventing vibration of an engine (not illustrated) of a vehicle from being transmitted to a vehicle body (not illustrated) while supporting and fixing the engine, and includes the vibration isolation device 10 whose boss member 11 and outer tube member 12 are connected to each other by a vibration isolation base 13 that is formed of a rubber-like elastic material (refer to FIG. 3 on all of them), a first bracket 20 holding the outer tube member 12 of the vibration isolation device 10 and attached to the engine side, and a second bracket 30 to which the boss member 11 of the vibration isolation device 10 is fixed and which is attached to the vehicle body side.

The vibration isolation device 10 is disposed in a vertical attitude in which the axial direction agrees to the vertical direction, is disposed in an inverted state in which the boss member 11 side comes to the lower side, and is surrounded by the second bracket 30. The first bracket 20 is extended horizontally outward in the radial direction (the direction orthogonal to the axis, upward in FIG. 1a) from the side of the vibration isolation device 10.

Also, in the first bracket 20 and the second bracket 30, attaching holes h1, h2 are bored at three positions respectively, and the first bracket 20 and the second bracket 30 are fastened and fixed to the engine side and the vehicle body side by bolts inserted to these respective attaching holes h1, h2. Further, a stopper rubber SG is mounted on the vibration isolation device 10 and the first bracket 20, and the upper surface side of the vibration isolation device 10 and the outer periphery side of a body section 21 (refer to FIG. 2) of the first bracket 20 are covered by the stopper rubber SG.

Figure 2:
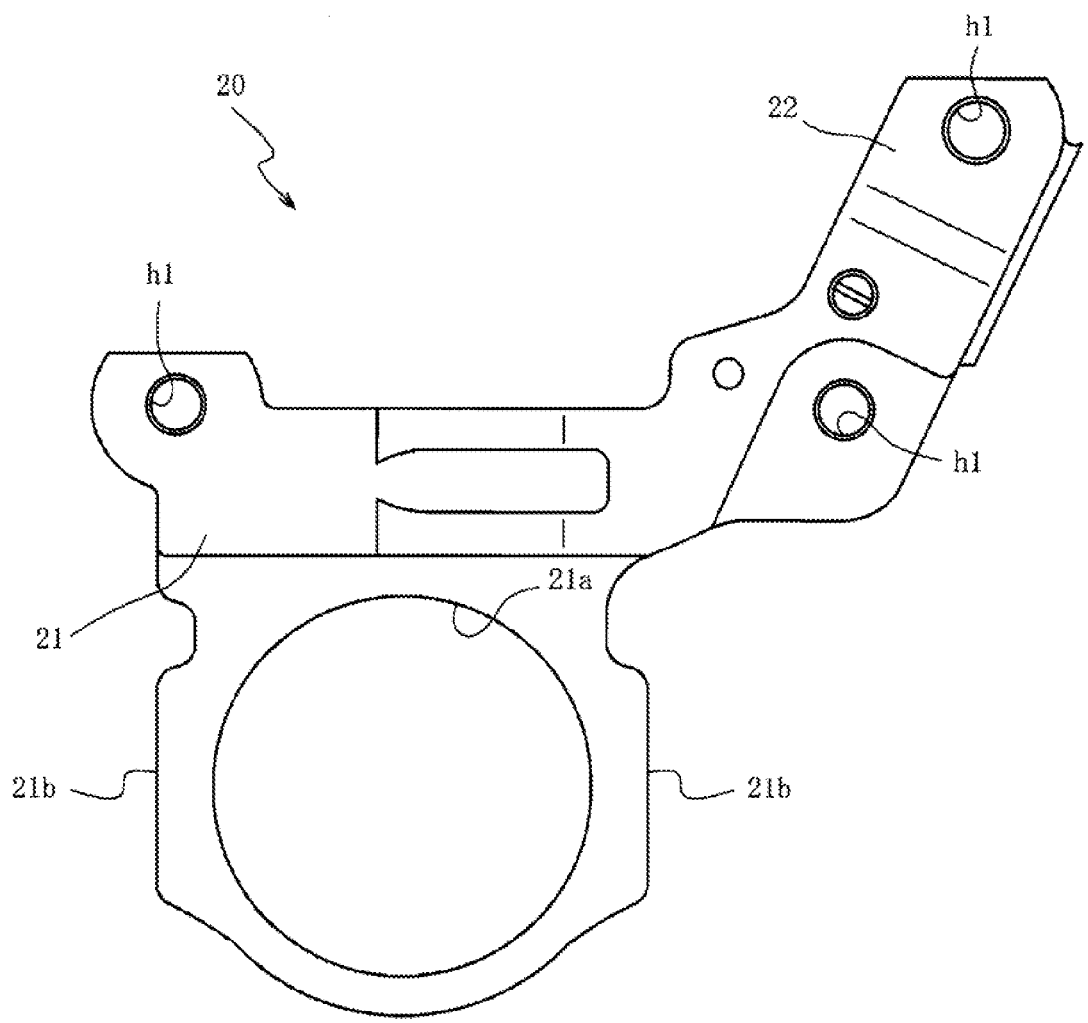
FIG. 2 is a plan view of a first bracket.

Next, the first bracket 20 will be described referring to FIG. 2. FIG. 2 is a plan view of the first bracket 20. Also, the direction orthogonal to the paper surface of FIG. 2 corresponds to the direction along which the vibration isolation device 10 is pressed in (that is the axis O direction after pressing in, refer to FIG. 2).

As shown in FIG. 2, the first bracket 20 mainly includes the body section 21 of a flat plate shape and an extension section 22 of a block shape extended diagonally from the corner on one side (the right side in FIG. 2) of the body section 21. At the corner on the other side (the left side in FIG. 2) of the body section 21 and both ends of the extension section 22, the attaching holes h1 described above are bored respectively. By screwing the bolts inserted to the attaching holes h1 to the engine side, the first bracket 20 is fastened and fixed to the engine side with the lower surface side (the back side of the paper surface in FIG. 2) becoming the attaching surface.

In the lower side in FIG. 2 of the body section 21, a press-in hole 21a of a circular shape in the top view is bored. To this press-in hole 21a, the outer tube member 12 of the vibration isolation device 10 is pressed in the axis O direction, and thereby the vibration isolation device 10 (the outer tube member 12) is held by the first bracket 20. Also, on both side surfaces (the right side and the left side in FIG. 2) of the body section 21, stopper surfaces 21b formed into a flat surface are formed. When a large displacement is inputted, the stopper action is exerted by that the stopper surfaces 21b abut upon a standing member 32 of the second bracket 30 through the stopper rubber SG (refer to FIG. 1) mounted on the vibration isolation device 10.

Also, in a state in which the vibration isolation unit 1 supportingly fixes the engine of an automobile to the vehicle body (a so-called 1W state), the vibration isolation base 13 is compressively deformed by the weight of the engine, and a predetermined gap is formed by that amount between the upper end side of the vibration isolation device 10 and a connecting member 33 of the second bracket 30.

Figure 3:
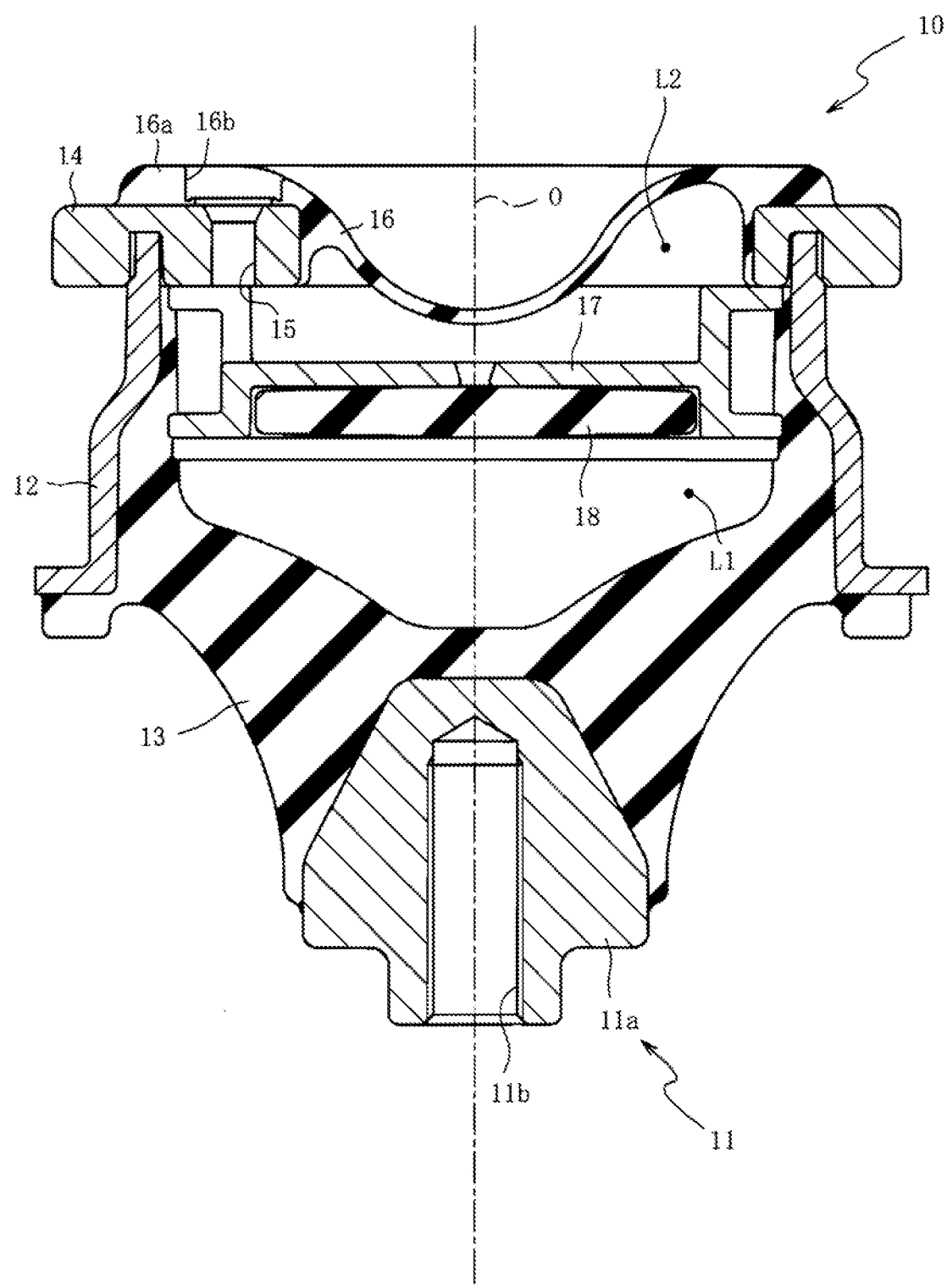
FIG. 3 is a cross-sectional view of the vibration isolation device.

Next, the vibration isolation device 10 constituting the vibration isolation unit 1 will be described referring to FIG. 3. FIG. 3 is a cross-sectional view of the vibration isolation device 10, and corresponds to a vertical cross section cut by a plane including the axis O. As shown in FIG. 3, the vibration isolation device 10 mainly includes the boss member 11 (refer to FIG. 1) that is attached to the vehicle body side through the second bracket 30 (refer to FIG. 1), the outer tube member 12 of a tubular shape that is attached to the engine side through the first bracket 20, and the vibration isolation base 13 that connects the both members 11, 12 to each other and is formed of a rubber-like elastic material.

The boss member 11 includes a base section 11a formed into a generally truncated cone cross-sectional shape which narrows upward, and a hole section 11b recessed in the lower surface of the base section 11a. The hole section 11b is a portion to which a shaft section (not illustrated) that projects downward (the lower side in FIG. 3) is screwed in, and the shaft section includes an extended section (not illustrated) that extends outward in the radial direction from the protruded distal end of the shaft section. The shaft section and the extended section are formed integrally from an aluminum alloy, and the base section 11a and the shaft section are formed so as to be symmetric around the axis O.

The outer tube member 12 is formed of an iron and steel material into a tubular shape in which the upper and lower ends (the upper side and the lower side in FIG. 3) open, and is disposed above (the upper side in FIG. 3) the boss member 11 so as to be concentric. Also, the outer tube member 12 is configured to include a step, a tubular section of a large diameter is disposed on the lower side (the lower side in FIG. 3) of the step and a tubular section of a small diameter is disposed on the upper side (the upper side in FIG. 3) of the step respectively, and the tubular section of a large diameter is pressed in to the first bracket 20 (refer to FIG. 2) in the axial direction and is held.

The vibration isolation base 13 is formed of a rubber-like elastic material into a generally truncated cone cross-sectional shape which narrows downward symmetric around the axis O, and is vulcanizingly adhered between the outer surface in the base section 11a of the boss member 11 and the inner wall surface of the outer tube member 12. An attaching plate 14 and a diaphragm 16 are disposed on the upper end side of the outer tube member 12, and a partition member 17 and an elastic partition membrane 18 are disposed inside the outer tube member 12.

The attaching plate 14 is an annular plate member to which the distal end side of the outer tube member 12 is securely attached, and is formed with a through hole 15 that penetrates in the plate thickness direction (the vertical direction in FIG. 3). The diaphragm 16 is formed of a rubber-like elastic material into a rubber membrane shape having a partially spherical shape, and an annular outer peripheral section 16a integrally formed of a rubber-like elastic material is vulcanizingly adhered to the upper surface (the upper side in FIG. 3) and the inner peripheral surface of the attaching plate 14. As a result, a liquid chamber in which liquid is enclosed is formed between the lower surface side of the diaphragm 16 and the upper surface side of the vibration isolation base 13. In the liquid chamber, an antifreeze liquid (not illustrated) such as ethylene glycol is enclosed.

In the outer peripheral section 16a of the diaphragm 16, a communication hole 16b is formed so as to penetrate in the thickness direction. The communication hole 16b is arranged at a position corresponding to the through hole 15 that is penetratingly formed in the attaching plate 14. The communication hole 16b is a portion to which a nozzle (will be described below) for pouring in liquid to the liquid chamber through the through hole 15 is inserted.

The partition member 17 is a member for partitioning the liquid chamber into a first liquid chamber L1 on the vibration isolation base 13 side and a second liquid chamber L2 on the diaphragm side, and an orifice passage for making the first liquid chamber L1 and the second liquid chamber L2 communicate with each other is formed on the outer peripheral side thereof. The vibration isolation device 10 absorbs vibration by resistance generated when the liquid filled in the first liquid chamber L1 and the second liquid chamber L2 passes through the orifice passage when the vibration occurs.

Also, in the center of the partition member 17, a pair of opposing walls in which plural openings are formed respectively are disposed so as to oppose each other, and the elastic partition membrane 18 formed of a rubber-like elastic material into a disk shape is accommodated between the opposing walls. Further, a part of a vibration transmitting passage from the partition member 17 to the vehicle body side can be constituted by the vibration isolation base 13 by invertedly disposing the vibration isolation device 10, attaching the boss member 11 on the vehicle body side, and attaching the outer tube member 12 on the vehicle body side. Therefore, when the elastic partition membrane 18 crashes into the opposing walls of the partition member 17 and vibrates, transmission of the vibration to the vehicle body side can be surely suppressed by a vibration insulating effect of the vibration isolation base 13 that constitutes a part of the vibration transmitting passage, and generation of the noise can be reduced.

Figure 4:
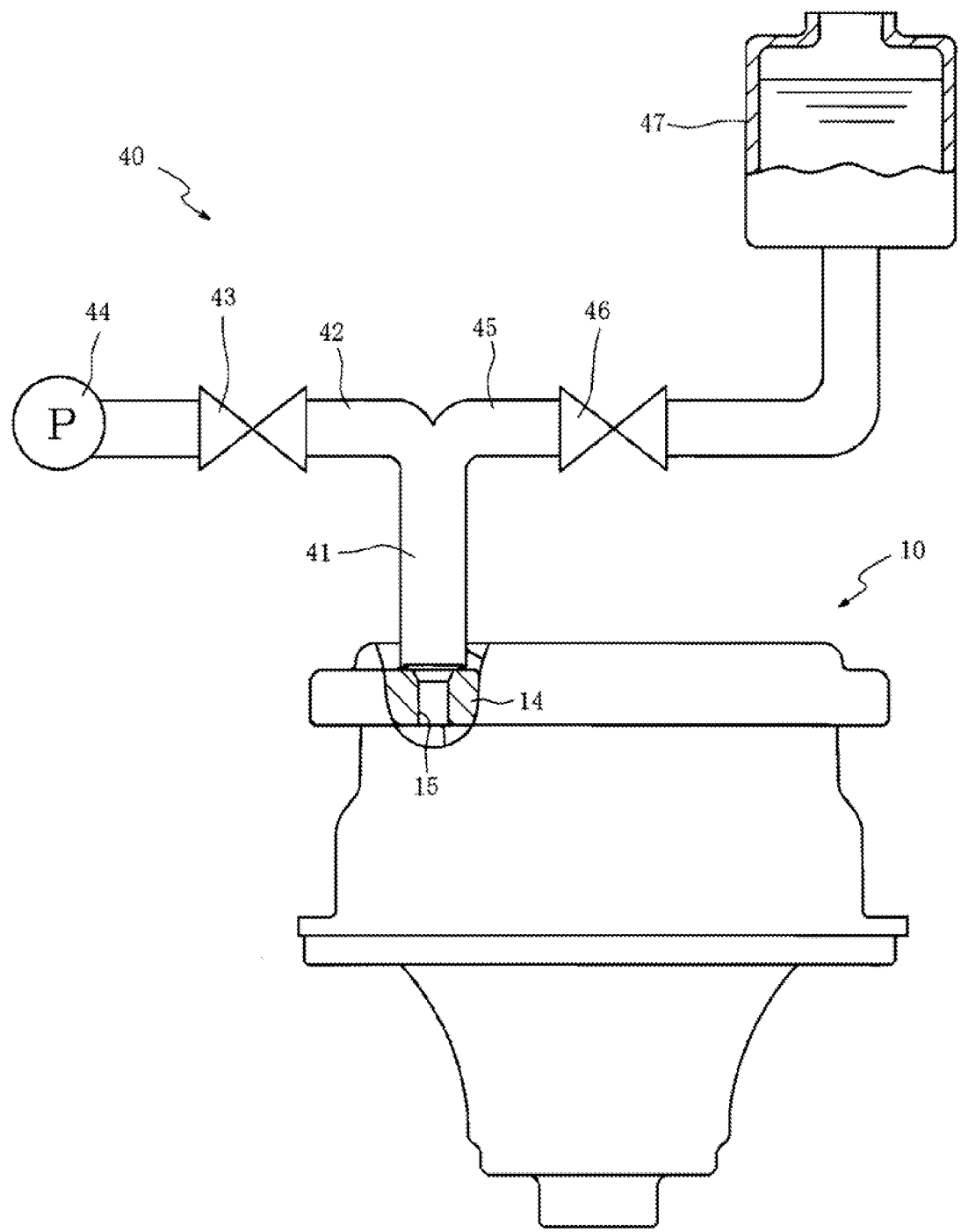
FIG. 4 is a schematic view of the liquid filling device that fills liquid to the vibration isolation device.

Next, a motion of a liquid filling device 40 that fills liquid to the vibration isolation device 10 will be described referring to FIG. 4. FIG. 4 is a schematic view of the liquid filling device 40 that fills liquid to the vibration isolation device 10. The liquid filling device 40 includes a nozzle 41 that is connected to the through hole 15 of the vibration isolation device 10, an intake pipe 42 that communicates with the nozzle 41, a vacuum pump 44 that is connected to a base end section of the intake pipe 42 and decompresses the inside of the vibration isolation device 10, a liquid pouring pipe 45 that communicates with the nozzle 41, and a tank 47 that is connected to the base end section of the liquid pouring pipe 45 and stores the liquid supplied into the vibration isolation device 10. An intake valve 43 that opens/closes the intake pipe 42 is disposed in the intake pipe 42, and a liquid pouring valve 46 that opens/closes the liquid pouring pipe 45 is disposed in the liquid pouring pipe 45.

First, in a state in which the intake valve 43 and the liquid pouring valve 46 are closed, the liquid filling device 40 connects the tip of the nozzle 41 to the thorough hole 15 that is formed in the attaching plate 14 of the vibration isolation device 10, thereafter the vacuum pump 44 is operated, and the intake valve 43 is opened. As a result, the air inside a space that constitutes the liquid chamber (the first liquid chamber L1 and the second liquid chamber L2) of the vibration isolation device 10 is gradually discharged, and the inside of the space is decompressed.

Next, after closing the intake valve 43 and stopping operation of the vacuum pump 44, the liquid pouring valve 46 is opened. As a result, the liquid stored in the tank 47 is poured in (sucked) to the inside of the space of the vibration isolation device 10 from the through hole 15 through the liquid pouring pipe 45 and the nozzle 41. When the liquid is filled in the space of the vibration isolation device 10, the space becomes the liquid chamber (the first liquid chamber L1 and the second liquid chamber L2).

When the liquid of a required amount has been filled in the vibration isolation device 10, after closing the liquid pouring valve 46, the nozzle 41 is detached from the vibration isolation device 10. Then, the through hole 15 is sealed by a seal member (not illustrated) such as a known spherical member, blind rivet and the like. The vibration isolation device 10 in which the liquid has been filled in the liquid chamber (the first liquid chamber L1 and the second liquid chamber L2) and the through hole 15 has been sealed is attached between the engine side (the vibration generating side) and the vehicle body side (the vibration receiving side) through the first bracket 20 and the second bracket 30.

Also, when the liquid is to be filled in the vibration isolation device 10 using the liquid filling device 40, in order that the air is not mixed in from a connection section of the nozzle 41 and the through hole 15, the sealing performance of the connection section should be secured. When the sealing performance of the connection section deteriorates, the degree of vacuum (the degree of decompression) inside the vibration isolation device 10 drops in decompressing the inside of the space of the vibration isolation device 10 using the vacuum pump 44, and the air is mixed in to the liquid chamber of the vibration isolation device 10 in pouring the liquid from the tank 47. It is because the vibration isolation performance of the vibration isolation device 10 deteriorates when the air is mixed in to the liquid chamber of the vibration isolation device 10.

Figure 5:
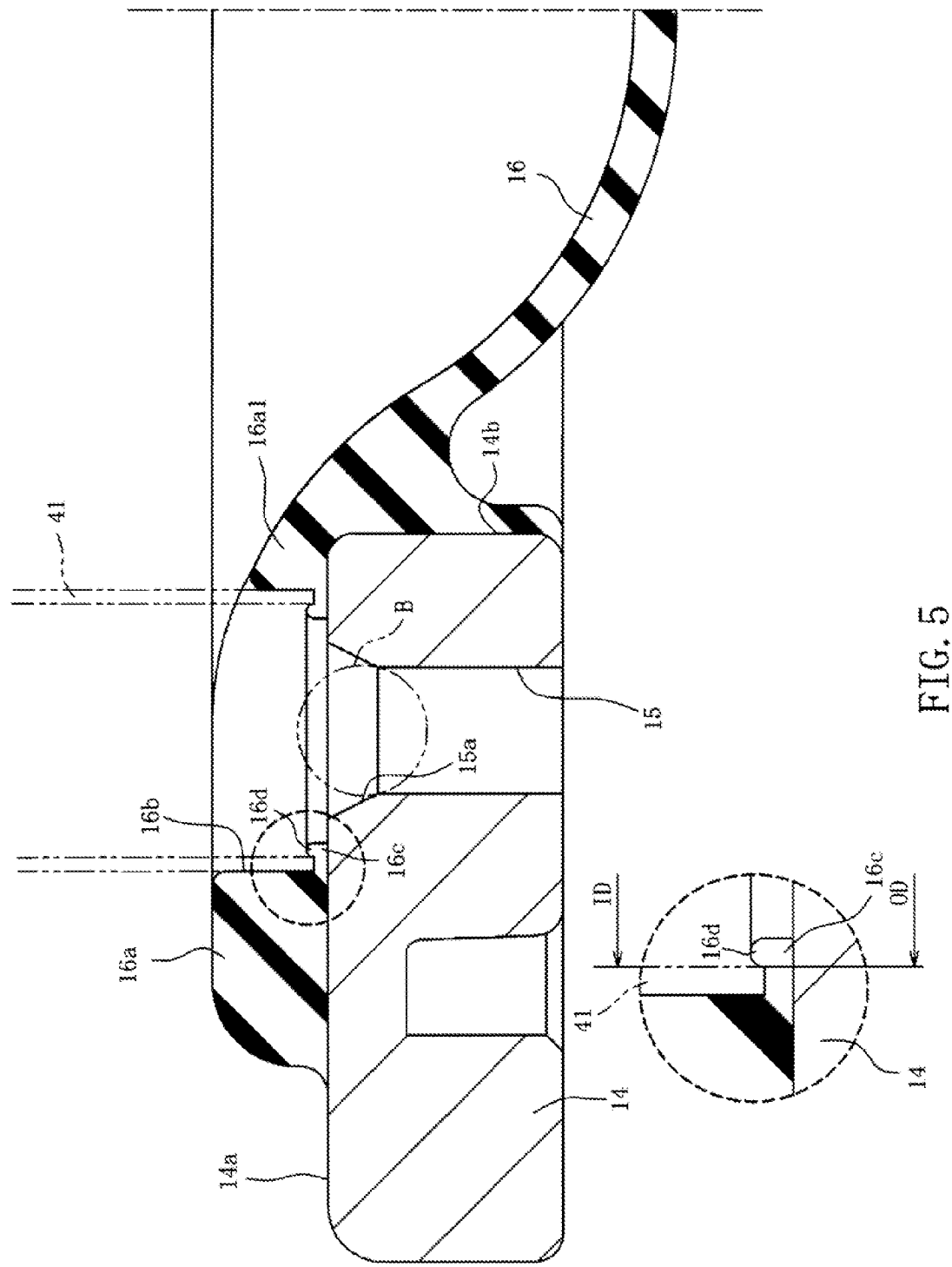
FIG. 5 is a cross-sectional view of the diaphragm and the attaching plate.

Next, the sealing structure for securing the sealing performance in filling the liquid will be described referring to FIG. 5. FIG. 5 is a cross-sectional view of the diaphragm 16 and the attaching plate 14. Further, although FIG. 5 is an illustration of a vertical cross section cut by a plane including the axis O, the cross section of one side (the left half in FIG. 3) with the axis O (the center line) being the center is illustrated, and illustration of the other (the right half in FIG. 3) is omitted (hereinafter the same as respect to FIG. 6 to FIG. 10).

As shown in FIG. 5, in the through hole 15, a taper section 15*a* is formed so as to join with the inner peripheral surface on an upper surface 14*a* side (one end side) of the attaching plate 14. The taper section 15*a* is a portion of a conical shape whose diameter on the upper surface 14*a* side (one end side) is made larger than the lower surface side (the other end side, the lower side in FIG. 5), and is a portion configured so as to be cable of locking the seal member formed of a spherical member B that is pressed in to the through hole 15 after the liquid has been filled. As described below, by pressing in the spherical member B to the through hole 15, the through hole 15 can be sealed and the liquid can be enclosed in the vibration isolation device 10.

The outer peripheral section 16*a* is vulcanizingly adhered to the upper surface 14*a* and an inner peripheral surface 14*b* of the attaching plate 14. By adhering the outer peripheral section 16*a* not only to the upper surface 14*a* of the attaching plate 14 but also to the inner peripheral surface 14*b*, compared with a case the outer peripheral section 16*a* is adhered only to the upper surface 14*a* of the attaching plate 14, the contact area of the outer peripheral section 16*a* to the attaching plate 14 can be increased, and the adhering strength of the diaphragm 16 (the outer peripheral section 16*a*) can be secured.

In the outer peripheral section 16*a*, the communication hole 16*b* is formed at a position that communicates with the through hole 15 formed in the attaching plate 14. The communication hole 16*b* is a portion to which the nozzle 41 is inserted, and the inside diameter thereof is set to a value larger than the outside diameter of the nozzle 41 and a value larger than the inside diameter of the through hole 15 and the taper section 15*a*. Also, the communication hole 16*b* is a hole section of a generally circular shape in the plan view, and is formed so as to be concentric with the through hole 15 and the taper section 15*a*.

Further, in the outer peripheral section 16*a*, a rubber membrane-like extension section 16*c* is arranged so as to extend from the inner surface of the communication hole 16*b* toward the through hole 15. The extension section 16*c* is formed into an annular shape, and is vulcanizingly adhered to the upper surface 14*a* of the attaching plate 14. In the extension section 16*c*, because the distal end thereof on the inner side in the radial direction is arranged apart at an interval with respect to the outer periphery of the taper section 15*a*, when bulging out (burr) of a rubber-like elastic material is generated, the burr can be suppressed from entering into the taper section 15*a* (the through hole 15).

At the distal end on the inner side in the radial direction of the extension section 16*c*, an annular lip section 16*d* is raised in the axial direction (the vertical direction in FIG. 5). The diaphragm 16, the outer peripheral section 16*a*, the extension section 16*c*, and the lip section 16*d* are integrally formed of a rubber-like elastic material, and the outer peripheral section 16*a* and the extension section 16*c* are vulcanizingly adhered to the upper surface 14*a* of the attaching plate 14. Also, in the present embodiment, the lip section 16*d* is formed into an arc (semi-circular) cross-sectional shape.

The extension section 16*c* is a portion for connecting the diaphragm 16 (the outer peripheral section 16*a*) and the lip section 16*d* with each other. Although, when the extension section 16*c* is to be omitted, it is necessary to arrange a pouring port for pouring in a rubber-like elastic material to the lip section 16*d* in a vulcanizing mold, because the diaphragm 16 (the outer peripheral section 16*a*) and the lip section 16*d* are connected with each other by the extension section 16*c*, arrangement of the pouring port in the lip section 16*d* can be omitted, and the diaphragm 16, the outer peripheral section 16a, the extension section 16c, and the lip section 16d can be integrally formed of a rubber-like elastic material.

Here, the inside diameter of the communication hole 16b is set to a value slightly larger than the outside diameter of the nozzle 41. Therefore, when the nozzle 41 is inserted to the communication hole 16b, the tip of the nozzle 41 can be guided to the through hole 15 that is formed to be concentric with the communication hole 16b. Also, the outside diameter OD (the length in the right/left direction in FIG. 5) of the lip section 16d is set slightly larger than the inside diameter ID of the nozzle 41, and the gap between the communication hole 16b and the lip section 16d (the gap between the inner surface of the communication hole 16b and the outer surface of the lip section 16d) is set slightly larger than the thickness of the nozzle 41. Thus, when the end surface of the nozzle 41 is pressed to the extension section 16c, the lip section 16d is compressively deformed in the radial direction (the right/left direction in FIG. 5). As a result, the sealing performance with respect to the nozzle 41 can be secured by the lip section 16d (the seal section).

Also, because the lip section 16d is formed into an arc (semi-circular) cross-sectional shape, the bearing stress with respect to the end surface (the inner surface) of the nozzle 41 can be secured while preventing the nozzle 41 from catching (biting) the lip section 16d. Therefore, the sealing performance by the lip section 16d can be secured stably.

Further, when the extension section 16c is set to have a thickness that enables compressive deformation in the axial direction (the vertical direction in FIG. 5), if the end surface of the nozzle 41 is pressed to the extension section 16c, the extension section 16c is compressively deformed in the axial direction (the vertical direction in FIG. 5), and the lip section 16d is compressively deformed in the radial direction (the right/left direction in FIG. 5). As a result, the sealing performance with respect to the nozzle 41 can be secured by the extension section 16c and the lip section 16d (the seal section).

In this case, the lip section 16d is not necessarily required. The reason is that, because the thickness of the extension section 16c is set to a thickness that enables compressive deformation in the axial direction, by evenly pressing the end surface of the nozzle 41 to the extension section 16c, the sealing performance can be secured by the extension section 16c. However, in this case, when the end surface of the nozzle 41 inclines relative to the extension section 16c, variation occurs in the bearing stress of the extension section 16c. When the variation occurs in the bearing stress of the extension section 16c, the air and the liquid may possibly leak from a position where the bearing stress is low. By arranging the lip section 16d, this problem can be eliminated, and, even when the variation occurs in the bearing stress of the extension section 16c, because the lip section 16d is securely attached to the end surface of the nozzle 41, deterioration of the sealing performance can be prevented.

Also, because the extension section 16c and the lip section 16d (the seal section) are formed so as to be integral with a rubber-like elastic material that constitutes the outer peripheral section 16a vulcanizingly adhered to the periphery on one end side of the through hole 15, in the liquid filling device 40, an O-ring disposed in the nozzle 41 can be omitted. Because the extension section 16c and the lip section 16d are formed so as to be integral with the diaphragm 16 and are used only once in manufacturing the vibration isolation device 10 as the seal section, slipping off of the seal section and deterioration of the seal section by repeated use do not occur. Therefore, deterioration of the sealing performance by time degradation and slipping off of the seal section in the liquid filling work can be prevented. Also, because it is possible to dispense with regular replacement of the O-ring, maintenance of the liquid filling device 40 can be simplified.

Further, in the vibration isolation device 10, the outer peripheral section 16a of the diaphragm 16 is vulcanizingly adhered to the annular attaching plate 14, and the through hole 15 is formed so as to penetrate the attaching plate 14 in the thickness direction. The communication hole 16b is formed so as to penetrate the outer peripheral section 16a of the diaphragm 16 in the thickness direction, and the communication hole 16b communicates with the through hole 15 on one end side (on the upper surface 14a side) of the through hole 15. Because the extension section 16c and the lip section 16d (the seal section) are formed so as to be integral with the outer peripheral section 16a of the diaphragm 16, the seal section can be formed on the upper surface 14a side of the attaching plate 14 while the outer peripheral section 16a of the diaphragm 16 is vulcanizingly adhered to the attaching plate 14. Because the upper surface 14a of the attaching plate 14 is equivalent to the outer surface of the liquid chamber (the second liquid chamber L2), the seal section can be formed easily.

On the other hand, when a rubber-like elastic material is arranged on the inner surface of the liquid chamber (when a rubber-like elastic material is vulcanizingly adhered to the lower surface (the opposite surface of the upper surface 14a) of the attaching plate 14 different from the case of the vibration isolation device 10 in the first embodiment), in order to vulcanizingly mold the seal section onto the outer surface (the upper surface 14a of the attaching plate 14) of the liquid chamber so as to be integral with a rubber-like elastic material, it is necessary to connect the rubber-like elastic material on the inner surface of the liquid chamber and the seal section on the outer surface of the liquid chamber with each other through the through hole 15. That is, the inner surface of the through hole 15 is required to be covered with the rubber-like elastic material. However, because the hole diameter of the through hole 15 is small, it is hard to cover the inner surface of the through hole 15 with the rubber-like elastic material, and it is necessary to arrange a slender pin for preventing the through hole 15 from being blocked by the rubber-like elastic material in a vulcanizing mold. Because the pin is slender and is easily broken, maintenance of the vulcanizing mold becomes troublesome. According to the vibration isolation device 10 in the present embodiment, these problems can be addressed, the seal section can be easily formed on the outer surface of the liquid chamber without covering the inner surface of the through hole 15 with the rubber-like elastic material, and maintenance of the vulcanizing mold can be simplified.

Also, with respect to the outer peripheral section 16a, because the communication hole 16b is formed, a dam section 16a1 is arranged in the periphery of the communication hole 16b. The dam section 16a1 is a portion for storing the liquid that has leaked from the nozzle 41 (the liquid that has overflowed from the through hole 15) when the liquid is filled to the vibration isolation device 10 by the liquid filling device 40 and the nozzle 41 is lifted up. With respect to the thickness (the vertical direction in FIG. 5) of the outer peripheral section 16a adhered to the upper surface 14a of the attaching plate 14 from the upper surface 14a, because the inner side in the radial direction (the right side in FIG. 5) of the outer peripheral section 16a is formed thinner compared with the outer side in the radial direction (the left side in FIG. 5), in the dam section 16a1, the height on the inner side in the radial direction (the right side in FIG. 5) of the outer peripheral section 16a is set lower compared with the outer side in the radial direction (the left side in FIG. 5). Because the liquid can be stored up to the height of the dam section 16a1, the highest liquid level (the maximum height of the liquid level) when the liquid is poured in through the through hole 15 in a state in which the vibration isolation device 10 is maintained horizontal is the same as the height of the dam section 16a1.

Here, the height of the dam section 16a1 and the depth of the taper section 15a are set so that the upper end of the spherical member B (the seal member) locked by the taper section 15a becomes lower than the dam section 16a1. Thus, when the liquid poured in through the nozzle 41 is stored in the vibration isolation device 10, the spherical member B locked by the taper section 15a can be immersed in the liquid. When a part (the upper end side) of the spherical member B locked by the taper section 15a is exposed from the liquid level and is in contact with the air, the air might possibly be mixed in to the through hole (the liquid chamber) along with the spherical member B when the spherical member B is pressed in to the through hole 15. When the air is mixed in to the liquid chamber, the vibration isolation performance of the vibration isolation device 10 may deteriorate. On the other hand, by pressing in the spherical member B immersed in the liquid to the through hole 15, the air can be suppressed from being mixed in to the inside of the through hole 15 when the spherical member B is pressed in to the through hole 15. As a result, the vibration isolation performance of the vibration isolation device 10 can be secured stably.

Further, although the extension section 16c and the lip section 16d interfere with the nozzle 41 and are elastically deformed, they are made not to interfere with the spherical member B (the seal member). If the extension section 16c and the lip section 16d (the seal section) interfere with the spherical member B, the interference of the seal section by the spherical member B cannot be made constant due to the tolerance of each member and the like, and variation possibly occurs in compression of the seal section. As a result, one in which compression of the seal section is insufficient may possibly be produced. Insufficient compression of the seal section may possibly become a cause of such malfunction that the liquid leaks from the through hole and the air is introduced to the liquid chamber.

On the other hand, because the seal section does not affect the sealing performance of the through hole 15 brought by the spherical member B by making the extension section 16c and the lip section 16d (the seal section) not to interfere with the spherical member B (the seal member), the sealing performance of the through hole 15 by the spherical member B (the seal member) can be stabilized. As a result, the malfunction such as leakage of the liquid can be prevented from occurring in the vibration isolation device 10.

Figure 6:
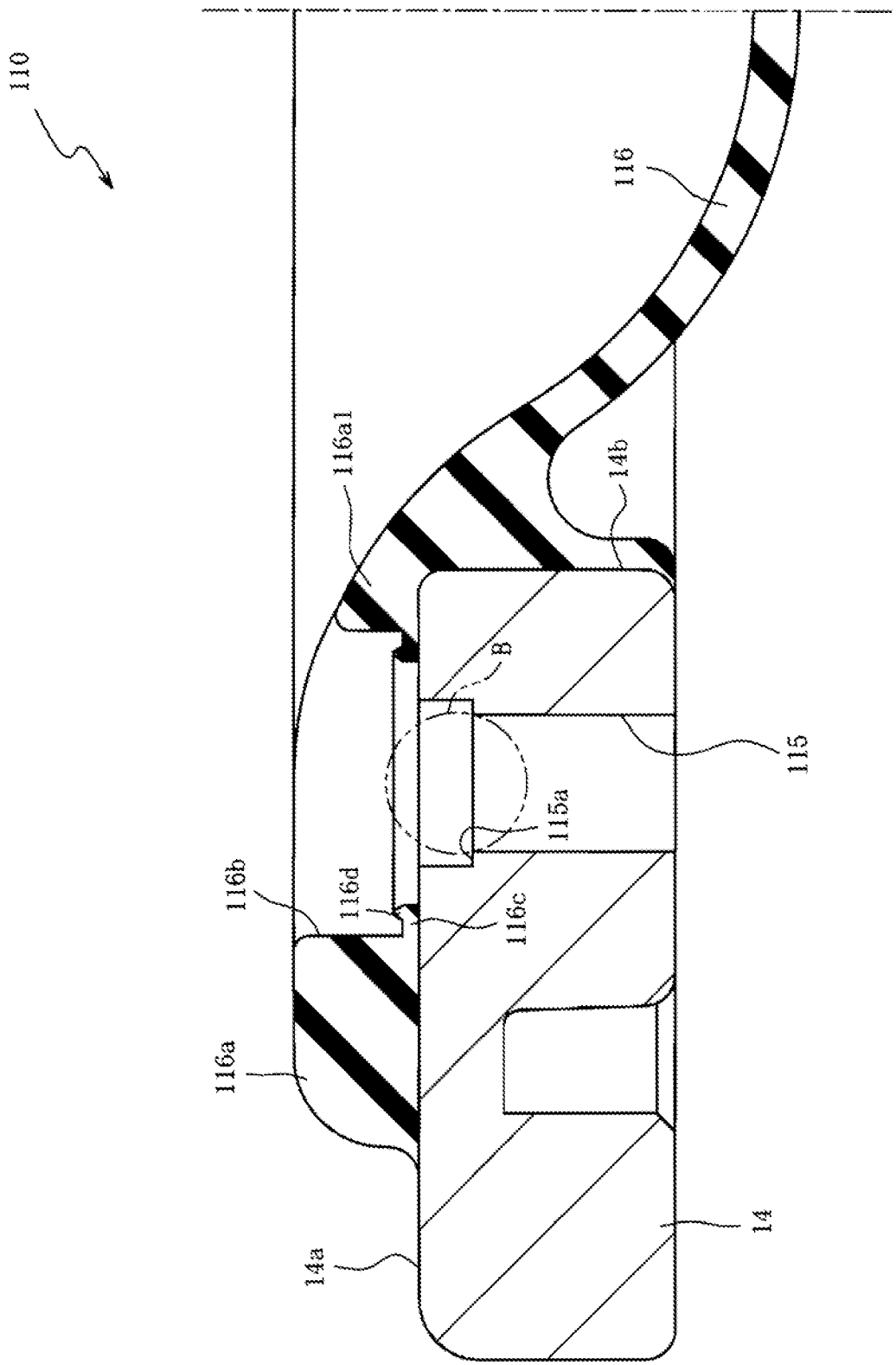
FIG. 6 is a cross-sectional view of the diaphragm and the attaching plate of the vibration isolation device in a second embodiment.

Next, a second embodiment will be described referring to FIG. 6. In the first embodiment, a case was described in which the lip section 16d was formed into an arc (semi-circular) cross-sectional shape and the spherical member B (the seal member) was locked by the taper section 15a that is formed in the through hole 15. On the other hand, in the second embodiment, a case is described in which a lip section 116d is formed into a triangular cross-sectional shape and a spherical member (not illustrated) is locked by a step section 115a that is formed in a through hole 115. Also, with respect to the same portions as those in the first embodiment, the same reference signs will be given and description hereinafter will be omitted. FIG. 6 is a cross-sectional view of a diaphragm 116 and the attaching plate 14 of a vibration isolation device 110 in the second embodiment.

As shown in FIG. 6, in the through hole 115 that penetrates the attaching plate 14 in the thickness direction, the step section 115a is formed so as to join with the inner peripheral surface on the upper surface 14a side (one end side) of the attaching plate 14. The step section 115a is a portion of a tubular shape whose diameter on the upper surface 14a side (one end side) is made larger than the lower surface side (the through hole 115), and is a portion configured so as to be cable of locking a seal member (not illustrated) that is pressed in to the through hole 115 after the liquid has been filled.

In an outer peripheral section 116a of the diaphragm 116, a communication hole 116b is formed at a position that communicates with the through hole 115 formed in the attaching plate 14. The communication hole 116b is a portion to which the nozzle 41 (refer to FIG. 5) is inserted, and the inside diameter thereof is set to a value larger than the outside diameter of the nozzle 41 and a value larger than the inside diameter of the through hole 115 and the step section 115a. Also, the communication hole 116b is a hole section of a generally circular shape in the plan view, and is formed so as to be concentric with the through hole 115 and the step section 115a.

In the outer peripheral section 116a, a rubber membrane-like extension section 116c is arranged so as to extend from the inner surface of the communication hole 116b toward the through hole 115. The extension section 116c is formed into an annular shape, and is vulcanizingly adhered to the upper surface 14a of the attaching plate 14. At the distal end on the inner side in the radial direction of the extension section 116c, the annular lip section 116d is raised. The diaphragm 116, the outer peripheral section 116a, the extension section 116c, and the lip section 116d are integrally formed of a rubber-like elastic material, and the outer peripheral section 116a and the extension section 116c are vulcanizingly adhered to the upper surface 14a of the attaching plate 14. Also, in the present embodiment, the lip section 116d is formed into a triangular cross-sectional shape.

Here, the inside diameter of the communication hole 116b is set to a value slightly larger than the outside diameter of the nozzle 41 (refer to FIG. 5). Therefore, when the nozzle 41 is inserted to the communication hole 116b, the tip of the nozzle 41 can be guided to the through hole 115 that is formed to be concentric with the communication hole 116b. Also, the outside diameter (the length in the right/left direction in FIG. 6) of the lip section 116d is set slightly larger than the inside diameter of the nozzle 41, and the gap between the communication hole 116b and the lip section 116d (the gap between the inner surface of the communication hole 116b and the outer surface of the lip section 116d) is set slightly larger than the thickness of the nozzle 41. Further, the thickness of the extension section 116c is set to a thickness that enables compressive deformation in the axial direction (the vertical direction in FIG. 6).

Thus, when the end surface of the nozzle 41 is pressed to the extension section 116c, the extension section 116c is compressively deformed in the axial direction (the vertical direction in FIG. 6), and the lip section 116d is compressively deformed in the radial direction (the right/left direction in FIG. 6). As a result, the sealing performance with respect to the nozzle 41 can be secured by the extension section 116c and the lip section 116d (the seal section). Also, because the lip section 116d is formed into a triangular cross-sectional shape, the nozzle 41 can be prevented from catching (biting) the lip section 116d, and the sealing performance by the lip section 116d can be secured.

Figure 7:
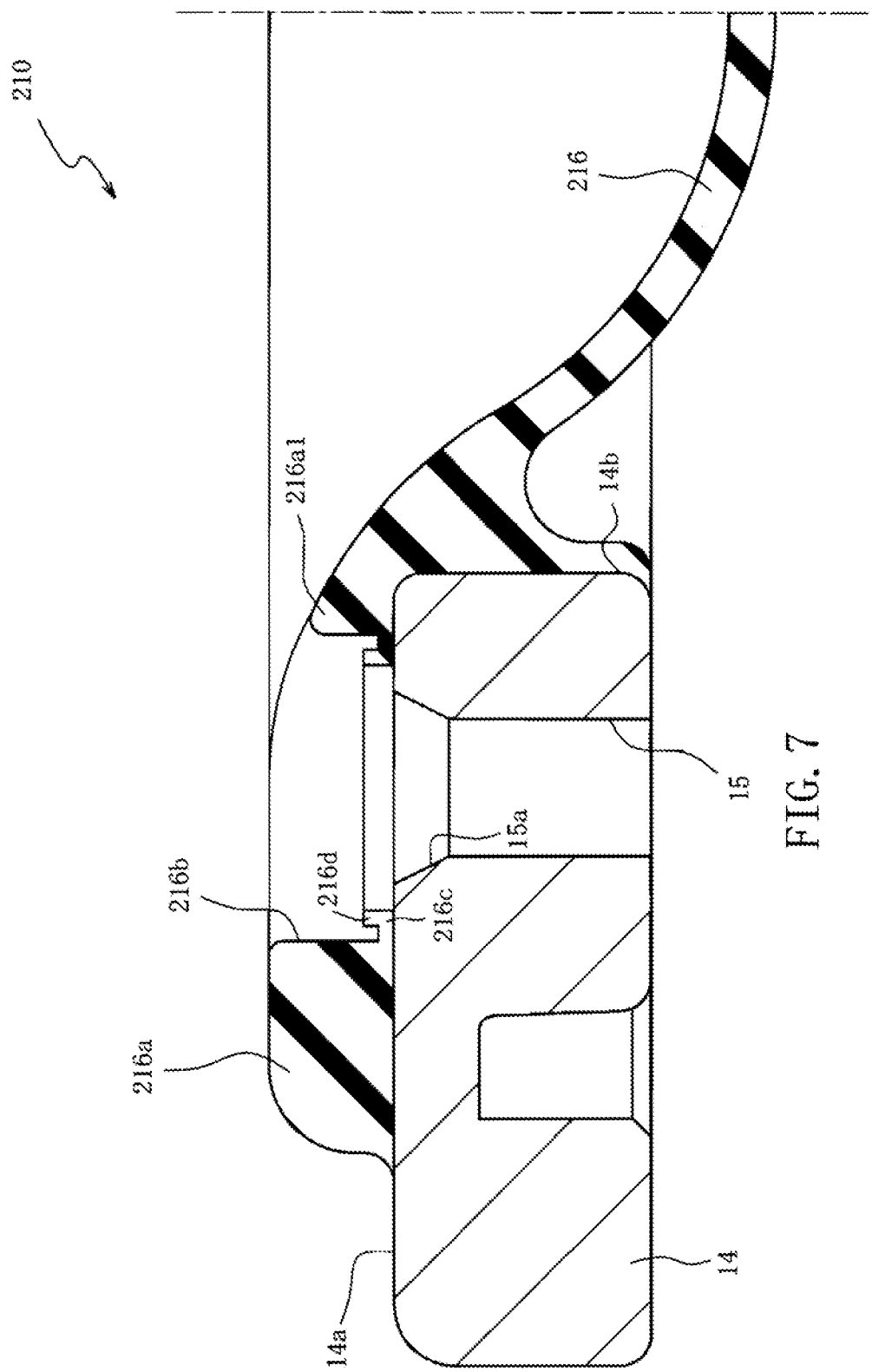
FIG. 7 is a cross-sectional view of the diaphragm and the attaching plate of the vibration isolation device in a third embodiment.

Next, a third embodiment will be described referring to FIG. 7. In the first embodiment, the case was described in which the lip section 16d was formed into an arc (semicircular) cross-sectional shape. On the other hand, in the third embodiment, a case is described in which a lip section 216d is formed into a rectangular cross-sectional shape. Also, with respect to the same portions as those in the first embodiment, the same reference signs will be given and description hereinafter will be omitted. FIG. 7 is a cross-sectional view of a diaphragm 216 and the attaching plate 14 of a vibration isolation device 210 in the third embodiment.

As shown in FIG. 7, in an outer peripheral section 216a of the diaphragm 216, a communication hole 216b is formed at a position that communicates with the through hole 15 formed in the attaching plate 14. The communication hole 216b is a portion to which the nozzle 41 (refer to FIG. 5) is inserted, and the inside diameter thereof is set to a value larger than the outside diameter of the nozzle 41 and a value larger than the inside diameter of the through hole 15 and the taper section 15a. Also, the communication hole 216b is a hole section of a generally circular shape in the plan view, and is formed so as to be concentric with the through hole 15 and the taper section 15a.

In the outer peripheral section 216a, a rubber membrane-like extension section 216c is arranged so as to extend from the inner surface of the communication hole 216b toward the through hole 15. The extension section 216c is formed into an annular shape, and is vulcanizingly adhered to the upper surface 14a of the attaching plate 14. At the distal end on the inner side in the radial direction of the extension section 216c, the annular lip section 216d is raised. The diaphragm 216, the outer peripheral section 216a, the extension section 216c, and the lip section 216d are integrally formed of a rubber-like elastic material, and the outer peripheral section 216a and the extension section 216c are vulcanizingly adhered to the upper surface 14a of the attaching plate 14. Also, in the present embodiment, the lip section 216d is formed into a rectangular cross-sectional shape.

Here, the inside diameter of the communication hole 216b is set to a value slightly larger than the outside diameter of the nozzle 41 (refer to FIG. 5). Therefore, when the nozzle 41 is inserted to the communication hole 216b, the tip of the nozzle 41 can be guided to the through hole 15 that is formed to be concentric with the communication hole 216b. Also, the outside diameter (the length in the right/left direction in FIG. 7) of the lip section 216d is set slightly larger than the inside diameter of the nozzle 41, and the gap between the communication hole 216b and the lip section 216d (the gap between the inner surface of the communication hole 216b and the outer surface of the lip section 216d) is set slightly larger than the thickness of the nozzle 41. Further, the thickness of the extension section 216c is set to a thickness that enables compressive deformation in the axial direction (the vertical direction in FIG. 7).

Thus, when the end surface of the nozzle 41 is pressed to the extension section 216c, the extension section 216c is compressively deformed in the axial direction (the vertical direction in FIG. 7), and the lip section 216d is compressively deformed in the radial direction (the right/left direction in FIG. 7). As a result, the sealing performance with respect to the nozzle 41 can be secured by the extension section 216c and the lip section 216d (the seal section). Also, because the lip section 216d is formed into a rectangular cross-sectional shape, the contact area with the end surface (the inner surface) of the nozzle 41 can be secured. Therefore, the sealing performance by the lip section 216d can be secured.

Figure 8:
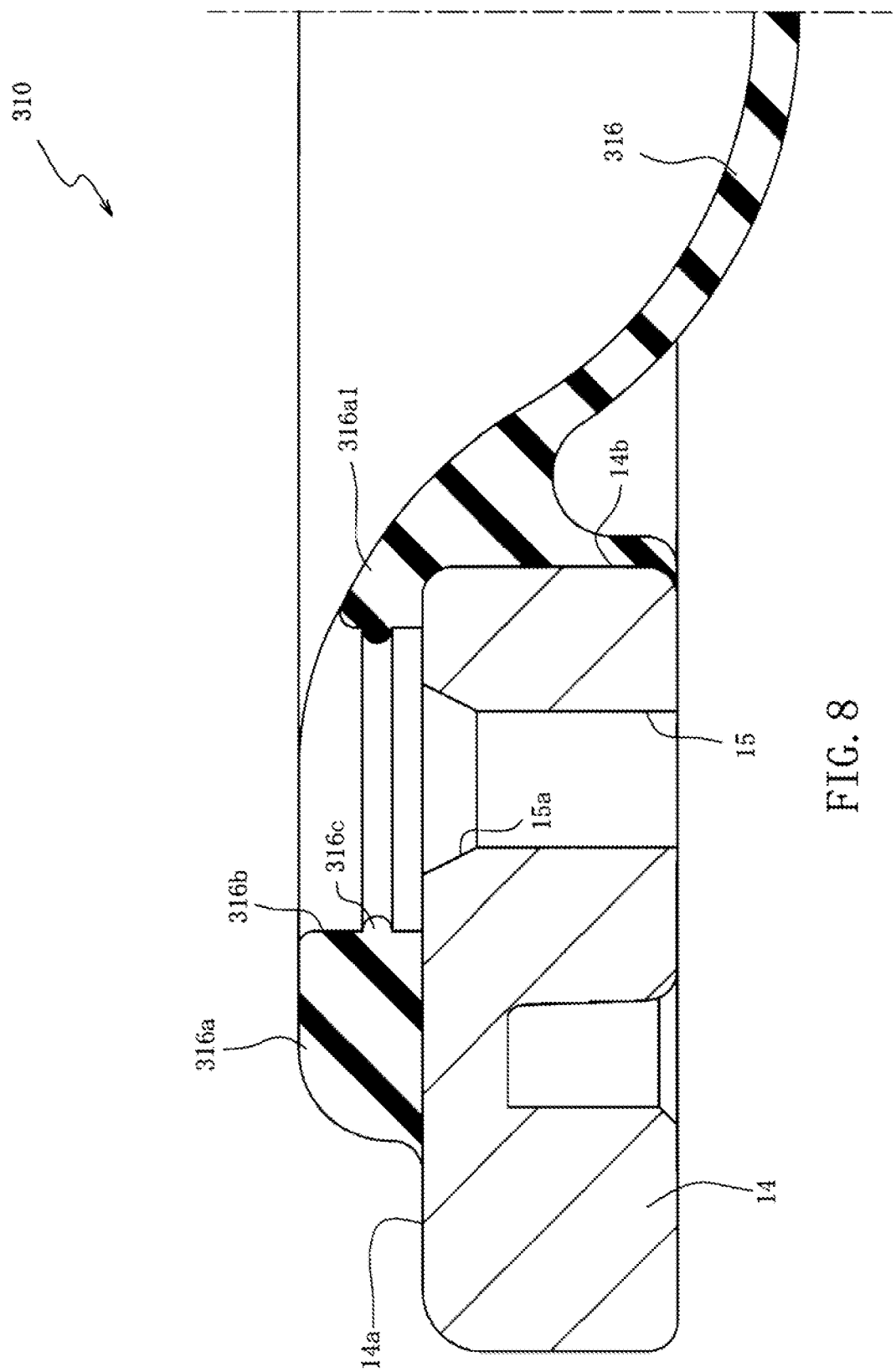
FIG. 8 is a cross-sectional view of the diaphragm and the attaching plate of the vibration isolation device in a fourth embodiment.

Next, a fourth embodiment will be described referring to FIG. 8. In the first embodiment to the third embodiment, cases were described in which the lip sections 16d, 116d, 216d were formed on the upper surface 14a of the attaching plate 14. On the other hand, in the fourth embodiment, a case is described in which a lip section 316c is projectingly arranged on the inner peripheral surface of a communication hole 316b. Also, with respect to the same portions as those in the first embodiment, the same reference signs will be given and description hereinafter will be omitted. FIG. 8 is a cross-sectional view of a diaphragm 316 and the attaching plate 14 of a vibration isolation device 310 in the fourth embodiment.

As shown in FIG. 8, in an outer peripheral section 316a of the diaphragm 316, the communication hole 316b is formed at a position that communicates with the through hole 15 formed in the attaching plate 14. The communication hole 316b is a portion to which the nozzle 41 (refer to FIG. 5) is inserted, and the inside diameter thereof is set to a value larger than the outside diameter of the nozzle 41 and a value larger than the inside diameter of the through hole 15 and the taper section 15a. Also, the communication hole 316b is a hole section of a generally circular shape in the plan view, and is formed so as to be concentric with the through hole 15 and the taper section 15a.

In the outer peripheral section 316a, the lip section 316c is projectingly arranged on the inner surface of the communication hole 316b inward in the radial direction of the communication hole 316b. The lip section 316c is formed annularly so as to continue in the peripheral direction of the communication hole 316b. The diaphragm 316, the outer peripheral section 316a, and the lip section 316c are integrally formed of a rubber-like elastic material. Also, in the present embodiment, the lip section 316c is formed into an arc (semi-circular) cross-sectional shape, and is arranged at a position departing a little from the upper surface 14a of the attaching plate 14 over the peripheral direction.

The inside diameter of the lip section 316c is set to a value slightly smaller than the outside diameter of the nozzle 41 (refer to FIG. 5). Therefore, when the nozzle 41 is inserted to the communication hole 316b, the lip section 316c is pressingly widened outward in the radial direction (the right/left direction in FIG. 8) by the outer peripheral surface of the nozzle 41, and the lip section 316c is compressively deformed. As a result, the sealing performance with respect to the nozzle 41 can be secured by the lip section 316c (the seal section).

Figure 9:
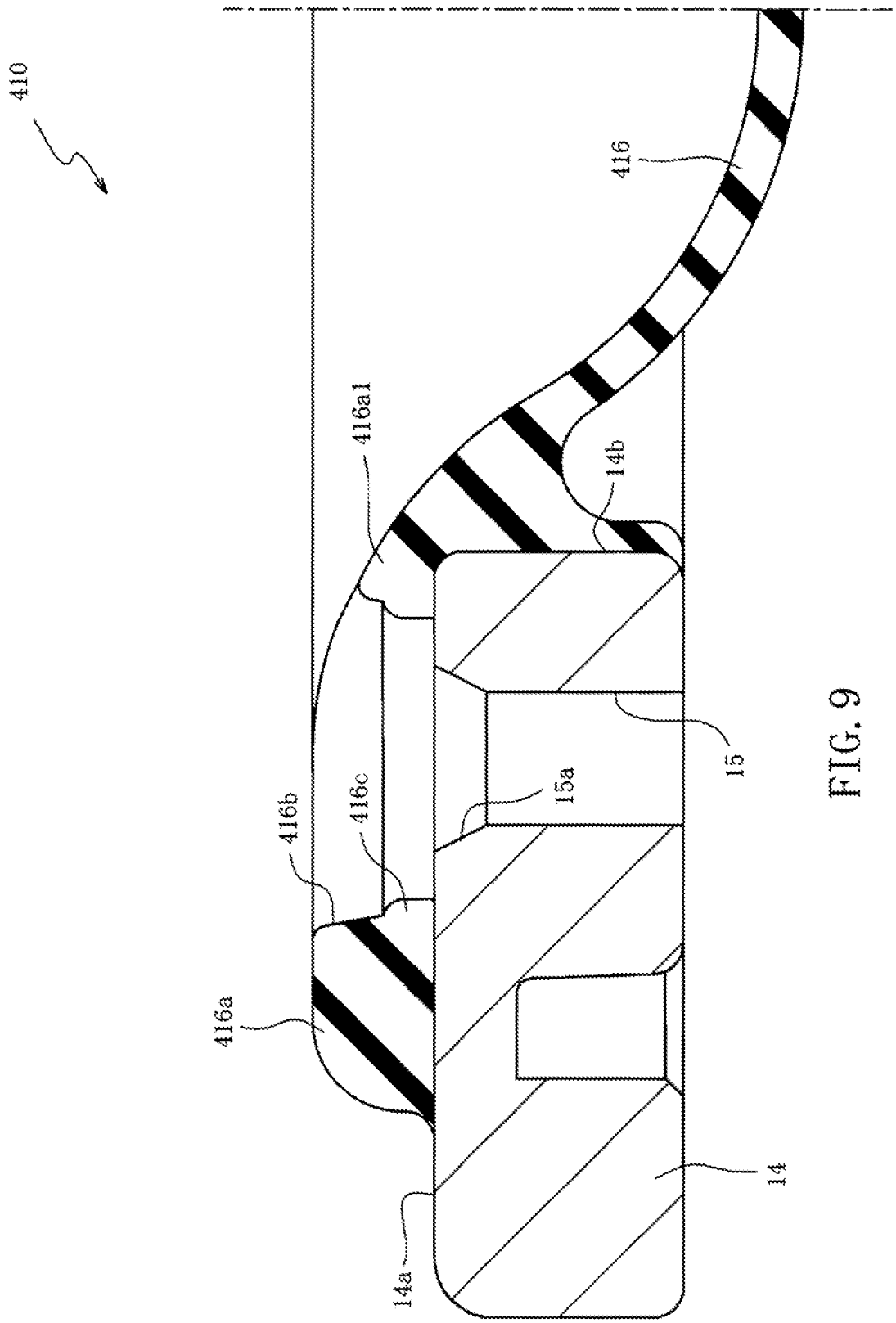
FIG. 9 is a cross-sectional view of the diaphragm and the attaching plate of the vibration isolation device in a fifth embodiment.

Next, a fifth embodiment will be described referring to FIG. 9. In the fourth embodiment, a case was described in which the lip section 316c projectingly arranged on the inner surface of the communication hole 316b was arranged at the position departing a little from the upper surface 14a of the attaching plate 14 so as to be in an undercut shape. On the other hand, in the fifth embodiment, a case is described in which a lip section 416c is adhered to the upper surface 14a of the attaching plate 14 in order to prevent the shape of the lip section 416c from becoming an undercut shape. Also, with respect to the same portions as those in the first embodiment, the same reference signs will be given and description hereinafter will be omitted. FIG. 9 is a cross-sectional view of a diaphragm 416 and the attaching plate 14 of a vibration isolation device 410 in the fifth embodiment.

As shown in FIG. 9, in an outer peripheral section 416a of the diaphragm 416, a communication hole 416b is formed at a position that communicates with the through hole 15 formed in the attaching plate 14. The communication hole 416b is a portion to which the nozzle 41 (refer to FIG. 5) is inserted, and the inside diameter thereof is set to a value larger than the outside diameter of the nozzle 41 and a value larger than the inside diameter of the through hole 15 and the taper section 15a. Also, the communication hole 416b is a hole section of a generally circular shape in the plan view, and is formed so as to be concentric with the through hole 15 and the taper section 15a.

In the outer peripheral section 416a, the lip section 416c is projectingly arranged on the inner surface of the communication hole 416b inward in the radial direction of the communication hole 416b. The lip section 416c is formed annularly so as to continue in the peripheral direction of the communication hole 416b, and is vulcanizingly adhered to the upper surface 14a of the attaching plate 14 over the peripheral direction. In order to prevent from becoming an undercut shape, in the communication hole 416b and the lip section 416c, the inside diameter thereof is set to be equal or larger as they depart from the upper surface 14a of the attaching plate 14 (as the height increases). Thus, because a vulcanizing mold can be released in the direction of opening the mold in vulcanizingly mold the diaphragm 416 and the lip section 416c, the degree of freedom in designing the vulcanizing mold can be secured.

The inside diameter of the lip section 416c is set to a value slightly smaller than the outside diameter of the nozzle 41 (refer to FIG. 5). Therefore, when the nozzle 41 is inserted to the communication hole 416b, the lip section 416c is pressingly widened outward in the radial direction (the right/left direction in FIG. 9) by the outer peripheral surface of the nozzle 41, and the lip section 416c is compressively deformed. As a result, the sealing performance with respect to the nozzle 41 can be secured by the lip section 416c (the seal section).

Figure 10:
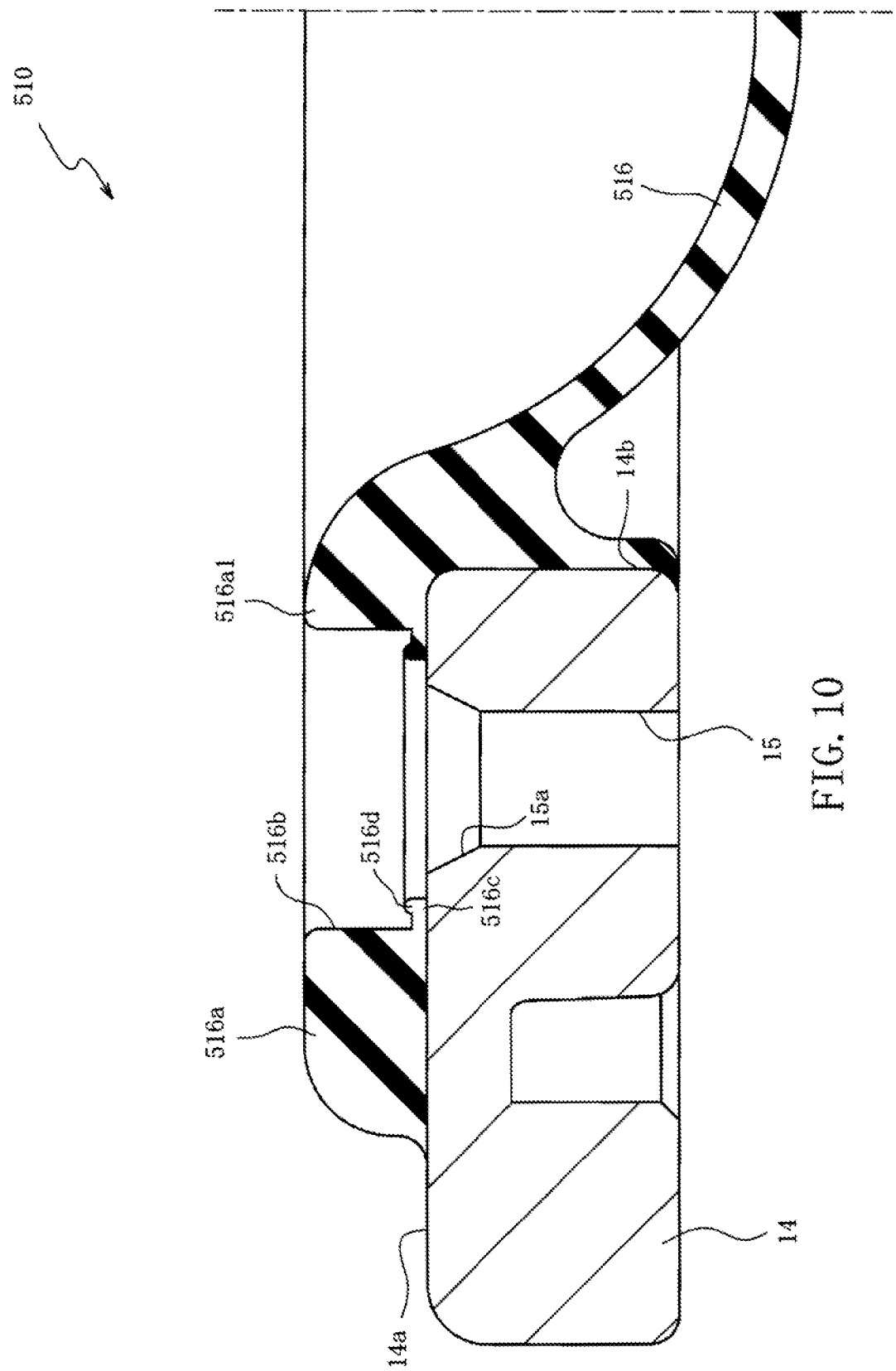
FIG. 10 is a cross-sectional view of the diaphragm and the attaching plate of the vibration isolation device in a sixth embodiment.

Next, a sixth embodiment will be described referring to FIG. 10. In the first embodiment to the fifth embodiment, cases were described in which the height of the dam sections 16a1, 116a1, 216a1, 316a1, 416a1 in the periphery of the communication holes 16b, 116b, 216b, 316b, 416b was formed to be large on the outer side in the radial direction of the outer peripheral sections 16a, 116a, 216a, 316a, 416a and small on the inner side in the radial direction, that is, the case the height of the dam sections 16a1, 116a1, 216a1, 316a1, 416a1 changed in the peripheral direction (around the communication hole). On the other hand, in the sixth embodiment, a case is described in which the height of a dam section 516a1 in the periphery of a communication hole 516b is set constant around the communication hole 516b. Also, with respect to the same portions as those in the first embodiment, the same reference signs will be given and description hereinafter will be omitted. FIG. 10 is a cross-sectional view of a diaphragm 516 and the attaching plate 14 of a vibration isolation device 510 in the sixth embodiment.

As shown in FIG. 10, in an outer peripheral section 516a of the diaphragm 516, the communication hole 516b is formed at a position that communicates with the through hole 15 formed in the attaching plate 14. The thickness of the outer peripheral section 516a that is positioned on the upper surface 14a of the attaching plate 14 is set to a generally equal thickness from the outside in the radial direction of the outer peripheral section 516a (the left side in FIG. 10) over to the inside in the radial direction (the right side in FIG. 10). Therefore, the height of the dam section 516a1 positioned in the periphery of the communication hole 516b becomes generally constant around the communication hole 516b.

The communication hole 516b is a portion to which the nozzle 41 (refer to FIG. 5) is inserted, and the inside diameter thereof is set to a value larger than the outside diameter of the nozzle 41 and a value larger than the inside diameter of the through hole 15 and the taper section 15a. Also, the communication hole 516b is a hole section of a generally circular shape in the plan view, and is formed so as to be concentric with the through hole 15 and the taper section 15a.

In the outer peripheral section 516a, a rubber membrane-like extension section 516c is arranged so as to extend from the inner surface of the communication hole 516b toward the through hole 15. The extension section 516c is formed into an annular shape, and is vulcanizingly adhered to the upper surface 14a of the attaching plate 14. At the distal end on the inner side in the radial direction of the extension section 516c, an annular lip section 516d is raised. The diaphragm 516, the outer peripheral section 516a, the extension section 516c, and the lip section 516d are integrally formed of a rubber-like elastic material, and the outer peripheral section 516a and the extension section 516c are vulcanizingly adhered to the upper surface 14a of the attaching plate 14. Because the configuration of the extension section 516c and the lip section 516d is the same as the configuration of the extension section and the lip section described in the first embodiment to the third embodiment, description hereinafter will be omitted.

According to the vibration isolation device 510, because the height of the dam section 516a1 in the periphery of the communication hole 516b is set constant around the communication hole 516b, the highest liquid level (the maximum height of the level of the liquid stored in the dam section 516a1) when the liquid is poured in through the through hole 15 in a state in which the vibration isolation device 510 is maintained horizontal can be secured to a maximum extent. Also, the height of the dam section 516a1 and the depth of the taper section 15a are set so that the upper end of the spherical member B (the seal member) locked by the taper section 15a becomes lower than the dam section 516a1. Thus, the spherical member B locked by the taper section 15a can be surely immersed in the liquid. By pressing in the spherical member B that is immersed in the liquid to the through hole 15, the air can be suppressed from being mixed in to the inside of the through hole 15 when the spherical member B is pressed in to the through hole 15. As a result, the vibration isolation performance of the vibration isolation device 510 can be secured stably.

The present invention has been described above based on the embodiments; however, it can be easily presumed that the present invention is not limited to the embodiments described above by any means, and a variety of improvements and alterations are possible within the scope not departing from the objects of the present invention.

Also, each embodiment described above may also be configured to be modified by adding a part or plural portions of the configuration possessed by the other embodiments to the embodiment, substituting a part or plural portions of the configuration possessed by the other embodiments for a part or plural portions of the configuration of the embodiment, and so on respectively within the scope not departing from the objects of the present invention. For example, it is possible to substitute any of the lip sections 16d, 116d, 216d, 316c, 416c, 516d in one embodiment for a lip section with a different cross-sectional shape in the other embodiment. Therefore, for example, it is possible to change the cross-sectional shape of the lip section 316c in the fourth embodiment (refer to FIG. 8) to a generally triangular shape, a generally rectangular shape, and the like.

In the respective embodiments described above, a case was described in which the through holes 15, 115 were sealed by pressing in the spherical member B; however the present invention is not necessarily limited to it, and it is obviously possible to seal the through holes 15, 115 using other known seal members. As the other seal members, a blind rivet can be cited for example. Even when other seal members such as the blind rivet are used, the lip sections 16*d*, 116*d*, 216*d*, 316*c*, 416*c*, 516*d* are made not to interfere with the seal member. Thus, occurrence of a malfunction that the air and the liquid leak from a position where the bearing stress of the lip sections 16*d*, 116*d*, 216*d*, 316*c*, 416*c*, 516*d* is low can be prevented.

In the sixth embodiment (refer to FIG. 10), a case was described in which the nozzle 41 was sealed utilizing elastic deformation of the extension section 516*c* and the lip section 516*d*; however, the present invention is not limited to it. It is obviously possible to omit the extension section 516*c* and the lip section 516*d*, and, instead, to set the hole diameter of the communication hole 516*b* smaller than the hole diameter of the nozzle 41 and larger than the hole diameter of the taper section 15*a* and to press the end surface of the nozzle 41 to the dam section 516*a*1. In this case, because the dam section 516*a*1 is compressed in the axial direction (the vertical direction in FIG. 10) by the end surface of the nozzle 41, sealing can be executed utilizing the restoring force of it. Because the extension section 516*c* and the lip section 516*d* can be omitted, the structure of the vulcanizing mold can be simplified.

Also, in the sixth embodiment (refer to FIG. 10), it is possible to mount another nozzle having the outside diameter larger than that of the nozzle 41 and allowing the end surface thereof to abut upon the dam section 516*a*1 on the liquid filling device 40 and to execute deaeration and liquid pouring for the vibration isolation device 510. In the vibration isolation device 510, because the height of the dam section 516*a*1 in the periphery of the communication hole 516*b* is set constant around the communication hole 516*b*, it is possible to bring the dam section 516*a*1 and the end surface of the nozzle into close contact with each other using a generalized nozzle whose end surface (tip) is flat.

In the respective embodiments described above, the outside diameter of the tip of the nozzle 41 was set to a value larger than the inside diameter of the taper section 15*a* and the step section 115*a* so that the tip of the nozzle 41 was not inserted to the taper section 15*a*, the step section 115*a* and the through holes 15, 115. If the tip of the nozzle 41 is configured to be inserted to the taper section 15*a* and the step section 115*a*, the amount of the liquid poured in to the liquid chamber reduces by a portion of the volume of the nozzle 41 inserted to the taper section 15*a* and the step section 115*a*. By configuring the nozzle 41 so that the tip thereof abuts upon the upper surface 14*a* of the attaching plate 14 (or the extension section 16*c*, 116*c*, 216*c*, 516*c*), the tip of the nozzle 41 can be prevented from being inserted to the taper section 15*a* and the step section 115*a*, and the amount of the liquid poured in to the liquid chamber can be prevented from reducing.

In the respective embodiments described above, although a case was described in which the taper section 15*a* and the step section 115*a* were formed in the through holes 15, 115, the taper section 15*a* and the step section 115*a* are not necessarily required.

In the respective embodiments described above, although a case was described in which the through hole 15 was penetratingly formed in the attaching plate 14, the present invention is not necessarily limited to it, and it is obviously possible to form the through hole in another member that is connected to the vibration generating side (the engine side) or the vibration receiving side (the vehicle body side) through the vibration isolation base 13. As the other member, the outer tube member 12, the base section 11*a* and the like are included for example. Because the outer surface of the outer tube member 12, the base section 11*a* and the like is curved, the shape of the end surface (the tip surface) of the nozzle 41 is made to be a curved shape that corresponds to the curved outer surface.

In the respective embodiments described above, although a case was described in which the respective members such as the outer tube member 12, the attaching plate 14 and the like of the vibration isolation device 10 were formed of an iron and steel material (a metallic material), the present invention is not necessarily limited to it. It is obviously possible to form the respective members such as the outer tube member 12, the attaching plate 14 and the like of the vibration isolation device 10 of a synthetic resin material. As the synthetic resin material, a thermoplastic resin excellent in formability can be used for example. Particularly, by using an engineering plastic such as polyamide, polyphthalamide, polyphenylene sulphide and the like, the mechanical strength can be improved. Also, it is obviously possible to use a fiber reinforced plastic in which such a synthetic resin material is reinforced by a fiber of glass and the like. When the respective members such as the outer tube member 12, the attaching plate 14 and the like are formed of a synthetic resin material, it is possible to join these members by welding instead of joining by pressing in, caulking and the like.

The invention claimed is:

1. A vibration isolation device, comprising:
   a first attaching member;
   a second attaching member;
   a vibration isolation base that connects the first attaching member and the second attaching member to each other in an elastically deformable manner and is formed of a elastic material;
   a liquid chamber where liquid is filled, with the vibration isolation base being a part of a separation wall;
   a through hole that communicates with the liquid chamber, penetrates one of the first attaching member and the second attaching member, and pours in the liquid to the liquid chamber from one end side through a nozzle; and
   a seal member that is inserted from one end side of the through hole, seals the through hole, and prevents the liquid filled in the liquid chamber from leaking,
   wherein a seal section is provided which is disposed in the periphery on one end side of the through hole, is formed integrally with a elastic material that is vulcanizingly adhered to the periphery on one end side of the through hole, interferes with an end surface or an outer peripheral surface of the nozzle, and is elastically deformed
   wherein the liquid chamber includes: a first liquid chamber formed with the vibration isolation base being a part of a separation wall; and a second liquid chamber partitioned against and communicating with the first liquid chamber by a partition member that is formed with an orifice passage, with at least a part of a separation wall being formed of a diaphragm made of a elastic membrane;
   an annular attaching plate to which an outer peripheral section of the diaphragm is vulcanizingly adhered is provided;
   the through hole is formed so as to penetrate the attaching plate in the thickness direction, and communicates with a communication hole that is formed so as to penetrate the outer peripheral section of the diaphragm in the thickness direction on one end side of the through hole; and
   the seal section is formed integrally with the outer peripheral section of the diaphragm.

2. The vibration isolation device according to claim 1, wherein the seal section does not interfere with the seal member.

3. The vibration isolation device according to claim 2,
wherein the seal member is a spherical member pressed in to the through hole;
the through hole includes a step section or a taper section that is formed on the inner peripheral surface on one end side with the diameter on one end side being made larger than that on the other end side, and is configured to be capable of locking the seal member before being pressed in; and
a dam section is provided which is formed in the periphery on one end side of the through hole integrally with the seal section, stores liquid poured in through the nozzle, and is set higher than an upper end of the seal member that is locked by the step section or the taper section.

4. The vibration isolation device according to claim 3, wherein an inside diameter on one end side of the step section or the taper section is set smaller than an outside diameter of the tip of the nozzle.

5. The vibration isolation device according to claim 1,
wherein the seal member is a spherical member pressed in to the through hole;
the through hole includes a step section or a taper section that is formed on the inner peripheral surface on one end side with the diameter on one end side being made larger than that on the other end side, and is configured to be capable of locking the seal member before being pressed in; and
a dam section is provided which is formed in the periphery on one end side of the through hole integrally with the seal section, stores liquid poured in through the nozzle, and is set higher than an upper end of the seal member that is locked by the step section or the taper section.

6. The vibration isolation device according to claim 5, wherein an inside diameter on one end side of the step section or the taper section is set smaller than an outside diameter of the tip of the nozzle.

7. The vibration isolation device according to claim 1,
wherein the seal member is a spherical member pressed in to the through hole;
the through hole includes a step section or a taper section that is formed on the inner peripheral surface on one end side with the diameter on one end side being made larger than that on the other end side, and is configured to be capable of locking the seal member before being pressed in; and
a dam section is provided which is formed in the periphery on one end side of the through hole integrally with the seal section, stores liquid poured in through the nozzle, and is set higher than an upper end of the seal member that is locked by the step section or the taper section.

8. The vibration isolation device according to claim 7, wherein an inside diameter on one end side of the step section or the taper section is set smaller than an outside diameter of the tip of the nozzle.

9. The vibration isolation device according to claim 1,
wherein the seal section includes: a rubber membrane extension section extended from the inner surface of the communication hole toward the through hole; and a lip section of an annular shape raised in the axial direction from the inside in the radial direction of the extension section;
the outside diameter of the lip section is set larger than an inside diameter of the nozzle; and
the inside diameter of the communication hole is set larger than an outside diameter of the nozzle.

10. The vibration isolation device according to claim 9, wherein a distal end on the inner side in the radial direction of the extension section is arranged apart at an interval with respect to the outer periphery of the step section or the taper section.

* * * * *